Figures 1, 2:
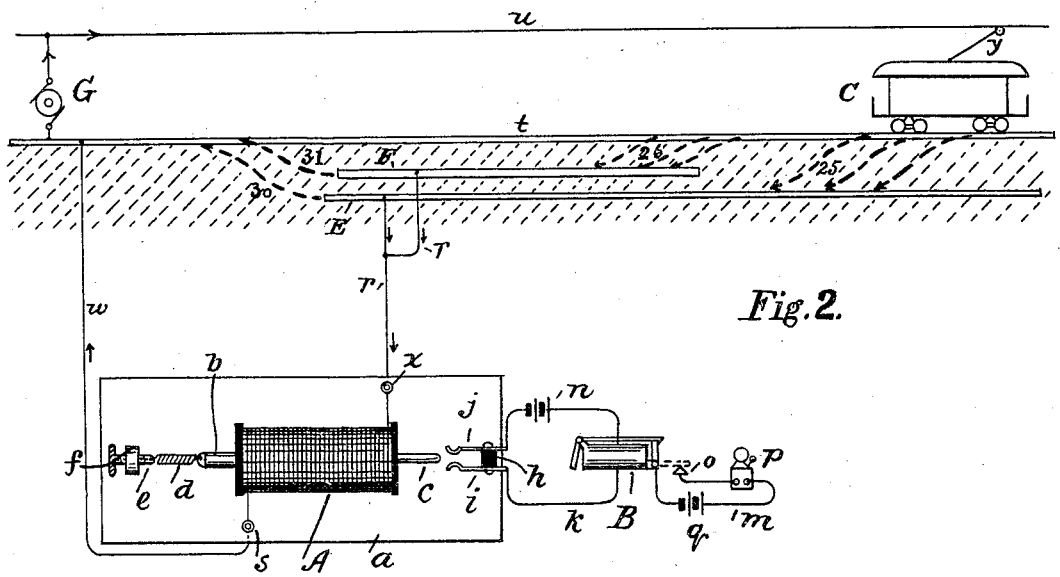

No. 792,025. PATENTED JUNE 13, 1905.
J. HAMILTON, Jr.
MEANS FOR PROTECTING ELECTRIC CIRCUITS.
APPLICATION FILED OCT. 16, 1903.

Attest,
Edmund A. Spence
Thomas M. Howard

Inventor,
John Hamilton Jr

No. 792,025.

Patented June 13, 1905.

UNITED STATES PATENT OFFICE.

JOHN HAMILTON, JR., OF BOSTON, MASSACHUSETTS.

MEANS FOR PROTECTING ELECTRIC CIRCUITS.

SPECIFICATION forming part of Letters Patent No. 792,025, dated June 13, 1905.

Application filed October 16, 1903. Serial No. 177,267.

*To all whom it may concern:*

Be it known that I, JOHN HAMILTON, Jr., residing at Boston, in the county of Suffolk and State of Massachusetts, have invented certain Improvements in Means for Protecting Electric Circuits, of which the following is a specification.

The invention about to be described relates to means for the protection of electric circuits and for giving an indication or notice by an alarm or annunciator when the difference of potential between any two points shall exceed any predetermined amount.

The invention is adapted for different kinds of circuits; but it has especial applicability to the protection of underground cables consisting of one or more insulated conductors in a lead sheath, and in this specification the invention will be described in association with such cables.

Underground cables are provided for various kinds of electrical service—such as telephone, electric-light, street-railways, and motor service of all kinds—and such cables are almost uniformly covered with a lead protecting-sheath. In the street-railway service as commonly constructed in this country the electric current is conveyed from the generator by means of feeder-cables to the trolley-wires, thence to the car-motors, and a return-circuit is made to the generator by the rails of the car-track. It frequently happens, however, that the current leaves the rails and finds a return-circuit of lesser resistance partly by way of the lead sheaths of the underground cables and also by the water and gas pipes in the ground and causes the destruction of the said sheaths and of the said pipes, the deterioration of the same being unnoticed until the conductors in the cables are destroyed and the service interrupted and the leakage of the water and gas takes place. The destruction of the lead sheaths and the consequent breaking down of the conductor-insulation is brought about more especially at the points where the wandering current leaves the same, the lead being melted and then the insulation destroyed.

The invention consists in including in a circuit formed by conductors from the lead sheath of cables and water or gas pipes to be protected to the return side of an electric supply-circuit an electromagnetic device—such, for instance, as a solenoid. Within the solenoid is a soft-iron core or plunger, normally held in a retracted position by a spring, but adapted when the current through the conductor exceeds a predetermined electromotive force to be forced outward against the power of the spring and close an indicator or alarm circuit to notify an observer or attendant without breaking the circuit in which it is located.

The invention is also adapted for the protection of overhead cables and conductors in case the live wire of a power or lighting circuit comes into contact therewith, current from which may flow along the lead sheathing to some point where it will leave the cable and reach the return side of the system at which it was generated, all of which I will now proceed to describe, and point out in the claims.

Of the drawings, Figure 1 is a horizontal section through the solenoid device, and Fig. 2 is a schematic plan view to describe the circuits and apparatus.

The figures are illustrative of a form of apparatus in which the invention is embodied. I do not, however, limit myself to the constructions represented.

Referring to the drawings, $a$ represents a base or panel of insulating material, in the central portion of which is secured a solenoid consisting of a bobbin of insulated wire A, having a hollow center, within which plays the soft-iron core or plunger $b$, normally retracted from the center of the bobbin by the spring $d$, whose opposite ends are connected, respectively, to the plunger and to the adjusting-screw $e$, held in a screw-nut in the upper end of the standard $f$ upon the base $a$. The opposite end of the plunger $b$ has a brass extension $c$, normally opposite the ends of the curved flat springs $i$ $j$, but not touching them. The springs $i$ and $j$ are secured to an insulating-standard $h$ upon the base $a$ and constitute the open terminals of a local circuit $k$ including a battery $n$ and a relay or annunciator B, whose shutter when released by its armature is adapted to fall upon the stop $o$ and close a circuit $m$, which may extend to any suitable distant place where there is an attendant and at which is located an alarm device $p$, shown as a vibrating bell energized by a battery $q$. I may employ a simple relay to close the circuit; but the shutter also serves as an indicator and is preferred. The ends of the helices A are attached to the respective binding-posts $s$ and $x$, which extend through the base $a$ and terminate at other binding-posts, $s^2$ and $x^2$, upon its under side. It is obvious that I may employ a closed-circuit system and operate the annunciators and alarms by opening their circuits.

In Fig. 2 I have represented the association of the solenoid device with an electric-railway system, in which G is the power-generator, having leads to the trolley-wire $u$ and to the rails $t$, the latter forming the return-circuit. C indicates a movable bridge or an electric car whose trolley-arm $y$ is adapted to convey current from the trolley-wire $u$ to the motors and thence to the return-circuit, of which the rails form the main part. Such railways extend away from the power-stations and curve around in a variety of directions, and for many reasons not always comprehended the return-path through the rails is of greater resistance than some other path through the lead sheaths of electric cables either upon the ground or underneath the same or by way of water and gas pipes or by a path made up of several of these conductors in series, with the result that the current takes the path of least resistance and the sheaths and pipes become destroyed by electrolysis, and in the case of cables the insulation of the conductors is frequently impaired and broken down and great damage results by the current reaching inflammable material and setting it on fire. E indicates an underground electric cable parallel with the rails $t$ of an electric railway, and the arrows 25 represent current leaving the rails $t$ and passing through the earth to and along the lead sheath of the cable and leaving the same, as shown by the arrow 30, and going through the earth to the generator by way of the rails or other available conductors, while F represents a water or gas pipe to which current comes, as shown by the arrow 26, and from which it leaves, as represented by the arrow 31. I locate the solenoid device at any suitable place and connect the screw-post $x^2$ by the conductors $r$ $r$ with the sheath of the cable E and the pipe F and extend a conductor $w$ from the binding-post $s^2$ to a point on the return-circuit of the railway near the power-station. The helices of the solenoid, the conductos $r$ and $w$, and spring $d$ are arranged so that current may pass up to a predetermined potential, and when it exceeds this limit the plunger is attracted, and in establishing its equilibrium lengthwise of the bobbin the rod $c$ is forced between the springs and closes the circuit $k$, whereupon the annunciator attracts its armature and the shutter falls upon the stop $o$ and closes the circuit $m$ and the alarm-bell $p$ is sounded, indicating to the attendant that there is trouble upon the circuit. I may, if I choose, place the alarm in the circuit $k$ and dispense with the relay or annunciator B. It will be readily seen that an overhead cable may be connected with the solenoid device and indicate trouble thereupon in a manner similar to the foregoing.

By the term "alarm" as used herein I mean any device that will indicate to an attendant the abnormal condition of the circuit.

I claim as my invention—

1. The combination with an electric circuit of a relay-circuit including a visual signal having a circuit-closer, a second circuit controlled thereby and including an audible alarm, and means for closing said relay-circuit when the difference of potential between two points of said electric circuit exceeds a predetermined quantity, said circuit-closing means including a solenoid device normally cut out from said first-mentioned circuit.

2. The combination with an electric power-circuit comprising a generator, a lead therefrom to a trolley-wire, a second lead to the rails, and movable bridges between said trolley-wire and rails, of a relay-circuit having a visual signal, a second relay-circuit controlled by said signal and including an audible alarm, and means for automatically closing said first relay-circuit when the difference of potential between two points of said power-circuit exceeds a predetermined quantity, said circuit-closing means including a solenoid device normally cut out from said power-circuit.

3. The combination with an electric power-circuit comprising a generator, a lead therefrom to a trolley-wire, a second lead to the rails, and movable bridges between said trolley-wire and rails, of a conductor in proximity to said rails but normally disconnected from said power-circuit, a relay-circuit having a visual signal, a second relay-circuit controlled by said signal and including an audible alarm, and a solenoid the helices of which are respectively connected one to the return side of said power-circuit, and the other to said conductor, said solenoid carrying a circuit-closer controlling said first relay-circuit.

In testimony whereof I have signed my name to this specification, in the presence of two subscribing witnesses, this 9th day of September, 1903.

JOHN HAMILTON, JR.

Witnesses:
C. H. HILE,
JOHN W. CORNING.